US008981646B2

(12) United States Patent
Kim

(10) Patent No.: US 8,981,646 B2
(45) Date of Patent: Mar. 17, 2015

(54) LIGHTING APPARATUS AND LIGHTING CONTROL SYSTEM

(71) Applicant: LG Innotek Co., Ltd., Seoul (KR)

(72) Inventor: Dae Hun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 59 days.

(21) Appl. No.: 13/796,198

(22) Filed: Mar. 12, 2013

(65) Prior Publication Data

US 2013/0249392 A1 Sep. 26, 2013

(30) Foreign Application Priority Data

Mar. 20, 2012 (KR) .......................... 10-2012-0028133

(51) Int. Cl.
*H01Q 1/26* (2006.01)
*H05B 37/02* (2006.01)
*F21V 29/00* (2006.01)
*F21K 99/00* (2010.01)
*F21V 23/00* (2006.01)
*F21V 23/04* (2006.01)
*H05B 33/08* (2006.01)
*F21Y 101/02* (2006.01)

(52) U.S. Cl.
CPC .......... *H05B 37/0272* (2013.01); *F21V 29/004* (2013.01); *F21K 9/1355* (2013.01); *F21V 23/009* (2013.01); *F21V 23/0435* (2013.01); *H05B 33/0803* (2013.01); *F21Y 2101/02* (2013.01); *Y02B 20/341* (2013.01)
USPC .............................. 315/34; 362/257; 362/294

(58) Field of Classification Search
CPC ...... H05B 37/0272; F21K 9/10; F21K 9/1355; F21V 23/004
USPC ................................ 315/33, 34; 362/257, 294
See application file for complete search history.

(56) References Cited

U.S. PATENT DOCUMENTS 7,318,659 B2 * 1/2008 Demarest et al. .............. 362/253
7,521,872 B2 * 4/2009 Bruning ......................... 315/158
2001/0036691 A1 11/2001 Kitazume et al.
(Continued)

FOREIGN PATENT DOCUMENTS

CN 201278057 Y 7/2009
CN 102269358 A 12/2011
(Continued)

OTHER PUBLICATIONS

European Search Report dated May 16, 2013 in European Application No. 13158956.6.
(Continued)

*Primary Examiner* — Thuy Vinh Tran
(74) *Attorney, Agent, or Firm* — Saliwanchik, Lloyd & Eisenschenk

(57) ABSTRACT

Disclosed are a lighting apparatus and a lighting control system. The lighting apparatus includes a heat radiation frame, at least one light emitting device on the heat radiation frame, a diffusion frame provided on the heat radiation frame to protect the at least one light emitting device and diffuse a light emitted from the at least one light emitting device, and a support frame provided under the heat radiation frame and having a receiving space to receive at least one module. The module includes a wireless communication module to transmit or receive a control single of the at least one light emitting device. The power supply module is physically separated from the wireless communication module.

13 Claims, 9 Drawing Sheets

(56) References Cited

U.S. PATENT DOCUMENTS

| | | |
|---|---|---|
| 2007/0097681 A1 | 5/2007 | Chich et al. |
| 2008/0092800 A1 | 4/2008 | Smith et al. |
| 2008/0211369 A1 | 9/2008 | Zhang et al. |
| 2011/0310624 A1 | 12/2011 | Preuschl et al. |
| 2012/0019138 A1 | 1/2012 | Maxik et al. |
| 2012/0293652 A1* | 11/2012 | Farmer .................. 348/143 |
| 2013/0175923 A1* | 7/2013 | Yotsumoto et al. .......... 315/70 |
| 2013/0181607 A1* | 7/2013 | Yotsumoto et al. .......... 315/70 |
| 2014/0062297 A1* | 3/2014 | Bora et al. .................. 315/34 |

FOREIGN PATENT DOCUMENTS

| | | |
|---|---|---|
| JP | 2006-313717 A | 11/2006 |
| JP | 2007-294143 A | 11/2007 |
| JP | 2008-204922 A | 9/2008 |
| JP | 2008-281679 A | 11/2008 |
| JP | 2010-062005 A | 3/2010 |
| JP | 2010-123490 A | 6/2010 |
| JP | 2011-044401 A | 3/2011 |
| JP | 2011-228130 A | 11/2011 |
| WO | WO-2010-092110 A1 | 8/2010 |
| WO | WO-2010/140136 A1 | 12/2010 |

OTHER PUBLICATIONS

Office Action dated Mar. 4, 2014, in Japanese Application No. 2013-047581.

Office Action dated Jun. 14, 2013 in Korean Application No. 10-2012-0028133, filed Mar. 20, 2012.

Office Action dated Sep. 29, 2014, in Chinese Application No. 2013-10090572.9.

* cited by examiner

440

430

420

410

460

450

LIGHTING APPARATUS AND LIGHTING CONTROL SYSTEM

CROSS-REFERENCE TO RELATED APPLICATION

This application claims the benefit under 35 U.S.C. 119 of Korean Patent Application No. 10-2012-0028133, filed Mar. 20, 2012 which is hereby incorporated by reference in its entirety.

BACKGROUND

The disclosure relates to a lighting apparatus. In particular, the disclosure relates to a wirelessly-controllable lighting apparatus and a lighting control system including the same.

Recently, the social/national necessity for a light emitting diode (LED) is rapidly increased for the eco-friendly purpose/low-carbon purpose and for the purpose of reducing energy consumption.

In general, to install lighting apparatuses in premises, buildings, and public places, the use purpose and the management/control of the lighting apparatus must be planed from a time point at which the buildings are designed.

The light emitting diode (LED) is a kind of a semiconductor device to convert electrical energy into light.

The LED has advantages of low power consumption, the semi-permanent life span, a rapid response speed, stability, and environmental friendliness when comparing with existing light sources such as fluorescent lamps and light bulbs.

Accordingly, many studies and researches have been performed to substitute the existing light sources with LEDs. The LEDs have been increasingly used as light sources of lighting apparatuses such as various lamps, liquid crystal displays, electric boards, and street lamps used indoors or outdoors.

However, even though the LEDs have the efficiency or the above technical advantages, the LEDs have practical problems in that the LEDs are highly priced and have the limitation in the technical differentiation to overcome the price higher than that of an existing lighting apparatus.

FIG. 1 is a view showing the structure of a lighting apparatus according to the related art.

Referring to FIG. 1, the lighting apparatus includes a heat radiation frame 10, a heat radiation plate 20 provided inside the heat radiation frame 10, a substrate 30 formed on the heat radiation plate 20 and having at least one light emitting device attached thereto, and a diffusion frame 40 formed on the heat radiation frame 10 to cover the substrate 30 having the light emitting device.

In addition, the heat radiation frame 10 is provided therein with a receiving groove (not shown), and a power supply module (not shown) is provided in the receiving groove.

The power supply module is electrically connected with the light emitting device attached to the substrate 30 to supply driving power to drive the light emitting device.

The light emitting device emits light by the driving power supplied through the power supply module, and the emitted light is radiated to the outside by the diffusion frame 40.

However, the LED lighting apparatus is not equipped with a function of adjusting the intensity of the light emitted from the LED by making communication with an external device.

In this case, in order to the LED lighting apparatus to have a function of automatically adjusting the intensity of the light, the power supply module must be controlled through an additional cable tube.

In other words, in order to control the lighting apparatus, the lighting apparatus is connected with the communication device (including a switch) through the cable tube, and the on-off control of the lighting apparatus and the integral control of the lighting apparatus are achieved by using the communication apparatus.

Accordingly, in the state that the lighting apparatus having no the above control function is installed, since lighting apparatus must be connected with the communication device through the cable tube. Therefore, after the lighting apparatus has been installed, the lighting apparatus may not be easily modified or replaced.

BRIEF SUMMARY

The embodiment provides a lighting apparatus having a wireless control function.

The embodiment provides a lighting apparatus having the structure to improve the performance of receiving a wireless control signal.

The embodiment provides a lighting system capable of effectively controlling the lighting apparatus by using a mobile terminal or a remote control device equipped with wireless control software.

The technical objects to be accomplished in suggested embodiments are not limited to the technical objects, and other objects can be clearly comprehended from the following description by those skilled in the art.

According to the embodiment, there is provided a lighting apparatus including a heat radiation frame, at least one light emitting device on the heat radiation frame, a diffusion frame provided on the heat radiation frame to protect the at least one light emitting device and diffuse a light emitted from the at least one light emitting device, and a support frame provided under the heat radiation frame and having a receiving space to receive at least one module. The module includes a wireless communication module to transmit or receive a control single of the at least one light emitting device.

According to the embodiment, there is provided a lighting system including a remote control device to transmit a control signal for lighting control, and a lighting apparatus to receive the control signal transmitted through the remote control device and to change a driving state of the lighting by using the received control signal. The lighting apparatus includes at least one light emitting device, a power supply unit to supply a driving power to the lighting apparatus, a wireless communication module driven by the supplied driving power to receive the control signal transmitted through the remote control device, and a lighting driving unit to control a driving state of the at least one light emitting device based on the control signal received through the wireless communication module.

According to the embodiment, there is provided a lighting apparatus including a power supply unit, a light emitting device to emit light, a lighting driving unit to receive a driving power through the power supply unit and control a driving state of the light emitting device under the supplied driving power, a wireless communication module to receive a control signal transmitted from an external device and to transmit the control signal to the lighting driving unit, and an antenna to receive the control signal by making communication with an external remote device and to transmit the control signal to the wireless communication module.

As described above, according to the embodiment, the lighting device is provided therein with the wireless communication module, so that the lighting of the lighting device can be conveniently controlled by using the mobile terminal or the low-price remote control without an additional cable tube.

In addition, according to the embodiment, the performance of receiving the control signal to control the lighting can be improved by exposing the antenna out of a metal case for heat radiation.

Further, according to the embodiment, the above-described lighting device is provided to represent the energy efficiency sufficient to collapse the price barrier of low-price lighting devices such as existing light bulb, increase the convenience of a user through the simple replacement of parts and the simple installation of software, and prevent the loss of additional cost resulting from a wireless control function.

DETAILED DESCRIPTION

Hereinafter, the suggested embodiment will be described.

Hereinafter, the embodiments will be described in detail with reference to accompanying drawings. The technical spirit of the disclosure is not limited to the embodiments. In addition, any other embodiments that are deteriorated by addition, change, and deletion of component parts or included within the scope of the spirit of the disclosure will be easily proposed.

In addition, although terms used in the embodiments are selected from general terms that are currently used, an applicant may arbitrarily suggest terms in specific cases. Since the terms suggested by the applicant will be described in detail in relation to operations and meanings in a corresponding description part of the embodiments, the embodiments should be understood in relation to the operations and meanings represented in the terms instead of names of the terms.

In the following description, when a predetermined part "includes" a predetermined component, the predetermined part does not exclude other components, but may further include other components if there is a specific opposite description.

Figure 1:
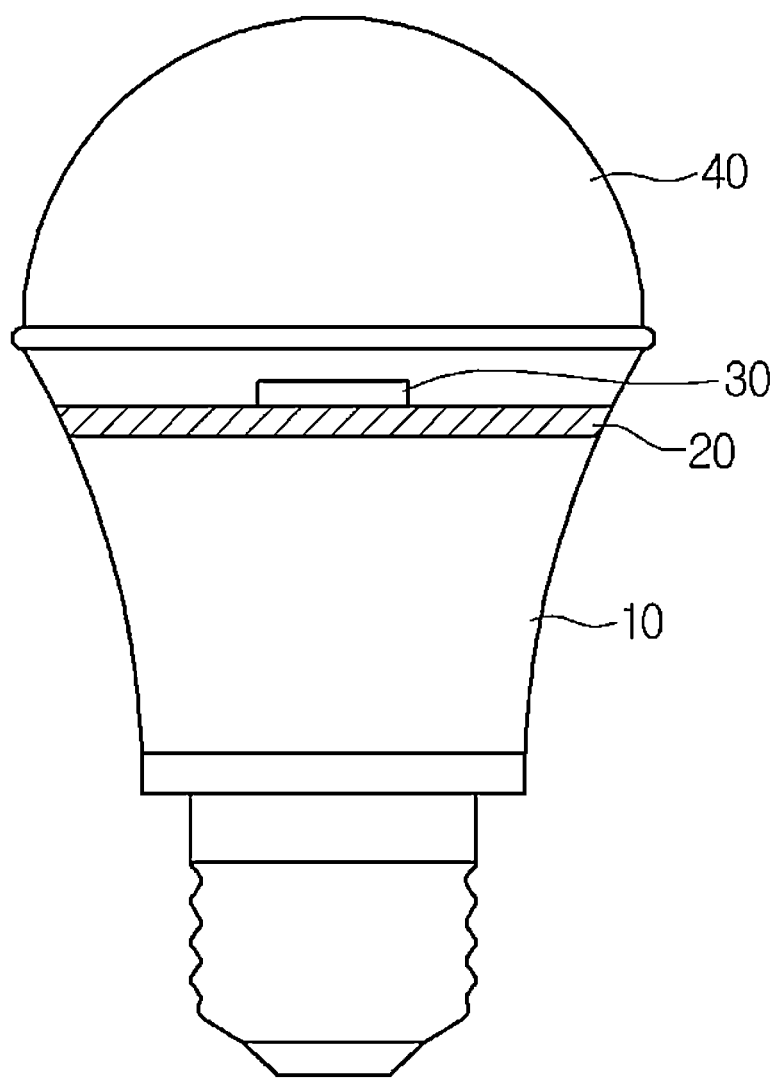
FIG. 1 is a view showing the structure of a lighting apparatus according to the related art.
Figure 2:
FIG. 2 is a block diagram showing a lighting control system according to the first embodiment.

FIG. 2 is a view showing a lighting control system according to the first embodiment.

As shown in FIG. 2, the lighting control system according to the first embodiment includes a movable remote controller 100 and a lighting device 200.

The remote controller 100 and the lighting device 200 may make bi-directional communication with each other. The communication scheme may include a Bluetooth scheme, which is one of short range wireless communication schemes, but the embodiment is not limited thereto. The following description will be made by limiting the communication scheme between the remote controller 100 and the lighting device 200 according to the first embodiment to the Bluetooth scheme.

When the remote controller 100 and the lighting apparatus 200 make the bi-directional communication through the Bluetooth, the remote controller 100 and the lighting apparatus 200 include wireless communication modules 110 and 240, which will be described later, respectively.

If the remote controller 100 receives an input according to the manipulation of a user, the remote controller 100 transmits a signal according to the user input to the lighting apparatus 200 through the Bluetooth.

The signal transmitted from the remote controller 100 to the lighting apparatus 200 may include a brightening control signal, a color control signal, and an on-off control signal of a light emitting device constituting the lighting device 200.

In this case, the Bluetooth refers to a communication standard to make data communication by using a frequency band of 2.4 GHz within the short range of about 10 m to about 100 m. The communication standard includes protocols to cope with the interference caused when the same frequency is used or to identify devices.

The remote controller 100 and the lighting device 200 according to the first embodiment follow a Bluetooth low energy (BLE) standard.

When comparing with an existing Bluetooth standard, the BLE standard provides a less duty cycle, allows low-price production, and allows the power consumption to be significantly reduced due to a low data rate. In addition, the BLE standard has advantages in that the connection procedure between devices is simplified, and the package size is reduced when comparing with the packet size recommended in the existing Bluetooth.

The BLE standard allows the realization of two modes such as a dual-mode and a single-mode. The dual-mode employs a low energy technology shared with an existing Bluetooth device, and is mainly applied to a mobile terminal such as a cellular phone. The single-mode is applied to an individual product such as a sensor and has the same protocol structure as that of the dual-mode.

The BLE standard used in the remote control device 100 according to the disclosure may be realized at the dual-mode or the single-mode.

The remote control device 100 as described above may include a mobile terminal or a remote controller.

In other words, the remote controller 100 may be a mobile terminal to make BLE communication, or may be a remote controller having a simple structure to make BLE communication.

If the remote control device 100 is realized as a mobile terminal, the mobile terminal may include any one of typical mobile phones, such as a cellular phone, a personal communication service (PCS) phone, a GSM phone, a CDMA-2000 phone, and a WCDMA phone, a portable multimedia player (PMP), a personal digital assistants (PDA), a smart phone, and a mobile broadcast system (MBS).

The lighting device 200 includes at least one light emitting device, receives a signal transmitted from the remote control device 100, and operates according to the received signal.

The lighting device 200 includes a communication unit to make communication with the remote control device 100.

The communication unit may employ the BLE standard the same as the communication standard used in the remote control device 100.

Hereinafter, the lighting device 200 will be described in more detail.

Figure 3:
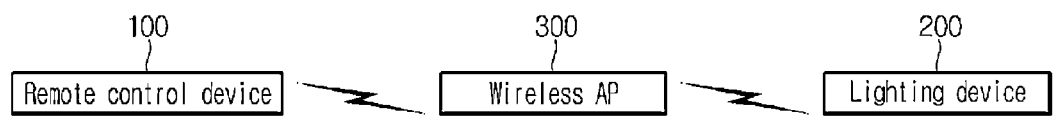
FIG. 3 is a block diagrams showing a lighting control system according to the second embodiment.

FIG. 3 is a block diagram showing a lighting system according to the second embodiment.

Referring to FIG. 3, the lighting system according to the second embodiment includes the remote control device 100, the lighting device 200, and a wireless access point (AP) 300.

In other words, the lighting system according to the first embodiment employs the BLE standard to limit the maximum number of clients (e.g., up to 8 clients). Accordingly, a great amount of lighting devices installed in a large-scale building cannot be efficiently controlled.

Therefore, the lighting system according to the second embodiment employs the wireless AP 300 interposed between the remote control device 100 and the lighting device 200, so that the lighting device 200 can be effectively controlled.

In other words, when a great amount of lighting devices installed in the large building cannot be controlled in the unit of a group or cannot be integrally controlled due to the limitation in the maximum number of clients resulting from the BLE standard, the wireless AP 300 is added as described above, so that the mesh network such as a Zigbee network can be constructed.

In this case, since a Zigbee device cannot be embedded in the mobile terminal such as a smart phone, the wireless lighting system may be constructed by using a Wi-Fi AP.

The Zigbee technology used in the second embodiment is one of representative technologies of a short-range wireless network representing the characteristics of low power consumption, a low price, and the easiness of the use. The Zigbee technology is a standard for upper-layer protocols and applications based on a physical (PHY) layer and a media access control (MAC) layer of the IEEE 802.15.4 standard. The Zigbee technology is the most appropriate communication scheme to the construction of a system which does not accelerate a data rate at a near distance and represent the low frequency in the use of a network.

Figure 4:
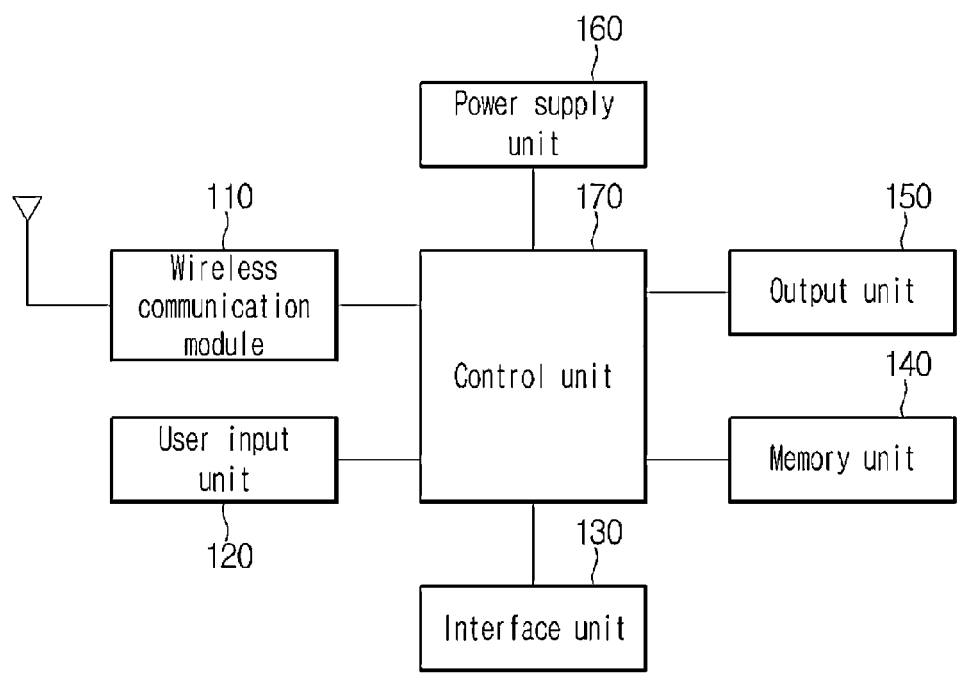
FIG. 4 is a view showing a remote control device according to the embodiment.

FIG. 4 is a view showing a remote control device according to the embodiment.

Referring to FIG. 4, the remote control device 100 may include a wireless communication module 110, a user input unit 120, an interface unit 130, a memory unit 140, an output unit 150, a power supply unit 160, and a control unit 170.

The wireless communication module 110 transmits a control signal input through the user input unit 120 to the lighting device 200.

The user input unit 120 receives input data used to control the operation of the lighting device 200 from the user. The user input unit 120 may include a key pad, a dome switch, a touch pad (resistive/capacitive type), a jog wheel, and a jog switch.

The interface unit 130 serves as a passage for all external devices connected to the remote control device 100. The interface unit 130 receives data or power from the external device to transmit the data or the power to each internal component of the remote control device 100 or transmit the internal data of the remote control device 100 to the external device. For example, the interface unit 130 may include a wired/wireless headset port, an external charger port, a wired/wireless data port, a memory card port, a port connecting a device equipped with an identification unit, an audio input/output (I/O) port, a video input/output (I/O) port, and an earplug port.

The memory unit 140 may store programs for the operation of the control unit 170, or may temporarily store input/output data (e.g., a phone book, a message, a still image, or a moving picture). The memory unit 140 may store data related to various vibrations and various sound effects output when a touch is input onto a touch screen.

The memory 140 may include a storage medium having at least one type of a flash memory type, a hard disk type, a multimedia card micro type, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc.

The remote control device 100 may operate in relation to a web storage performing the storage function of the memory 140 over the Internet.

The output unit 150 is used to generate visible, audible, or tactile outputs. The output unit 150 may include a display unit, a sound effect output unit, an alarm unit, and a haptic unit.

The power supply unit 160 receives the external power or the internal power under the control of the control unit 170 to supply the power required for the operation of each component.

The control unit 170 controls the overall operation of the remote control device 100.

In particular, the control unit 170 may perform a control operation so that the input signal received through the user input unit 120 is transmitted to the lighting device 200 through the wireless communication module 110.

The control unit 170 may perform a pattern recognition process allowing a writing input or a drawing input performed on the touch screen to be recognized as characters and images.

Figure 5:
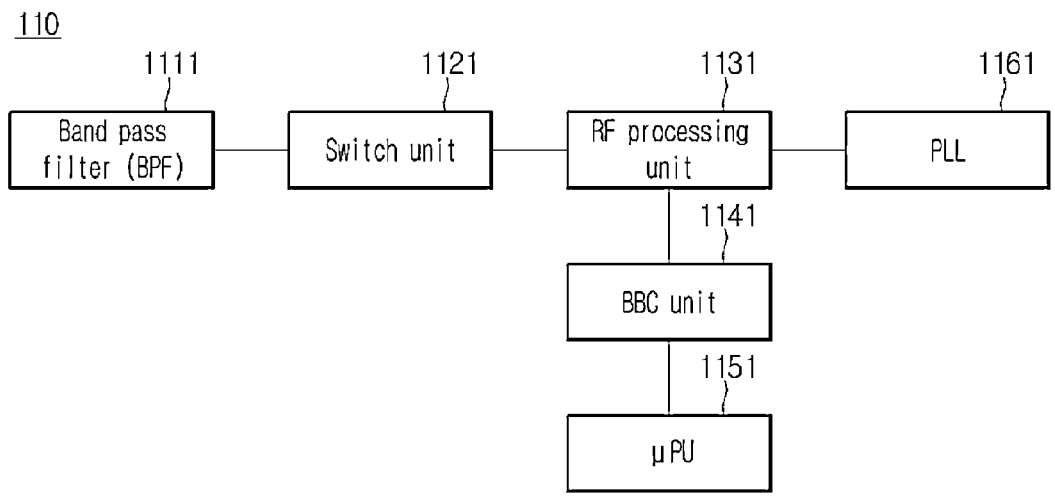
FIG. 5 is a block diagram schematically showing a wireless communication module of the remote control device according to the first embodiment.

FIG. 5 is a view showing schematically the wireless communication module 110 of the remote control device according to the first embodiment.

Hereinafter, the wireless communication module 110 according to the first embodiment will be referred to as a Bluetooth transmit unit 110.

Referring to FIG. 5, the Bluetooth transmit unit 110 includes a band pass filter (BPF) 1111, a switch unit 1121, a radio frequency processing unit 1131, a Bluetooth baseband core (BBC) unit 1141, a micro-processor unit (μPU) 1151, and a phase locked loop (PLL) unit 1161.

The components may be realized in one chip device, and the chip device may be mounted on a substrate and molded with the substrate to constitute the Bluetooth transmit unit 110.

In addition, components such as a memory, a power supply, a voice CODEC, and a headset interface may be further provided on the above components.

The band pass filter 1111 filters only a signal having a Bluetooth frequency band among singles introduced through an antenna and transmits the filtered signal to the switch unit 1121. The switch unit 1121 divides transmit and receive signals from each other and transmits the divided signals to an antenna or the radio frequency processing unit 1131.

The radio frequency processing unit 1131 includes receive and transmit stages (the internal components of the radio frequency processing unit 1131 are not shown). The receive stage converts an analog RF signal into an intermediate band signal, and the transmit stage converts the intermediate band signal into an analog RF signal.

The receive stage includes a low noise amplifier (LNA), a receive band pass filter (Rx BPF), a frequency mixer, an IF filter, and a receive signal processing module, and the transmit stage includes a power amplifier module (PAM), a transmit band pass filter (Tx BPF), a frequency mixer, an IF filter, and a transmit signal processing module.

Since the radio frequency processing unit 1131 follows the BLE standard, the radio frequency processing unit 1131 sets 40 communication channels to construct a wireless network, and controls the transmission and the reception of the Bluetooth communication.

The BBC 1141 is a part to process a physical-layer protocol, and includes a fast fourier transform (FFT) circuit, an error correction circuit, a digital modulator/demodulator, a channel encoding/decoding. The BBC unit 1141 performs coding/decoding with respect to a Bluetooth band signal and signal-processes the Bluetooth band signal as multimedia data. The BBC unit 1141 controls an input/output device such as a display unit or a key pad to provide a user interface.

In addition, when modulating/demodulating transmit and receive signals, the BBC unit 1141 detects the intensity of the signals to generate a gain control signal, and transmits the gain control signal to the LNA or the PAM of the RF processing unit 1131 to adjust the signal intensity.

The μPU 1151 controls a network link and executes an application to process a digital signal.

The PLL unit 1161 provides a frequency source signal to the RF unit 1131 by using a secondary loop filter.

Figure 6:
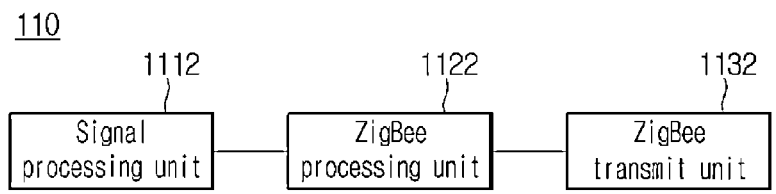
FIG. 6 is a block diagram schematically showing a wireless communication module of the remote control device according to the second embodiment.

FIG. 6 is a block diagram schematically showing a wireless communication module of the remote control device according to the second embodiment.

Hereinafter, the wireless communication module according to the second embodiment is called a ZigBee transmit module.

The ZigBee transmit module 110 may include a signal processing unit 1112, a ZigBee processing unit 1122, and a ZigBee transmit unit 1132.

The signal processing unit 1112 converts the signal input through the user input unit 120 into a digital signal to be transmitted to the ZigBee processing unit 1122.

The ZigBee processing unit 1122 encodes the digital signal, which is received through the signal processing unit 1112, through a direct sequence spread spectrum (DSSS) scheme and transmits the digital signal to the ZigBee transmit unit 1132. The DSSS scheme is one of a spread spectrum (SS) scheme. According to the DSSS, digital signals are distributed with a wide band under low power, and the distributed digital signals are simultaneously transmitted. Although noise occurs during communication, since the noise is spread when the signal is recovered, the noise slightly affects the communication. In addition, since the noise does not generate a strong signal, the noise does not interrupt another communication.

The ZigBee transmit unit 1132 modulates signals encoded by the ZigBee processing unit 1122 according to the IEEE 802.15.4 standard and transmits the signals to the lighting device 200.

As described above, the remote control device according to the embodiment wirelessly transmits a control signal to the lighting device 200 through the BLE standard or the ZigBee standard.

Figure 7:
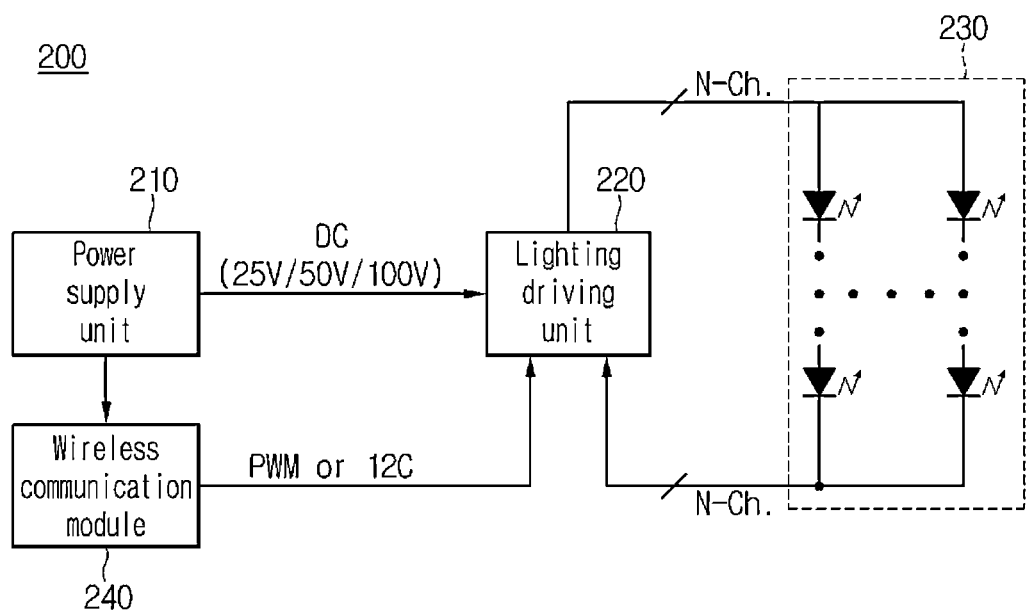
FIG. 7 is a view showing the structure of the lighting apparatus according to the embodiment.

FIG. 7 is a view showing the lighting device according to the embodiment.

Referring to FIG. 7, the lighting device 200 includes a power supply unit 210, a lighting driving unit 220, a lighting unit 230, and a wireless communication module 240.

The power supply unit 210 supplies a driving power to components constituting the lighting device 200.

For example, the power supply unit 210 may receive AC power of 110V to 220V and supply DC current of one of 25V, 50V, and 100V to the lighting driving unit 220. In addition, the power supply unit 210 may supply the DC power of 3V to the wireless communication module 240 by using the input AC power.

The lighting driving unit 220 receives power from the power supply unit 210 and changes driving power to be supplied to the lighting unit 230 based on the received power.

The lighting unit 230 may include at least one light emitting device, and a plurality of light emitting devices may be divided into a plurality of groups. The light emitting device may be a lighting emitting diode chip to emit one of red, green, and blue lights.

The lighting emitting diode chip may include a lateral type light emitting diode chip or a vertical type light emitting diode chip. The light emitting diode may emit one of blue, red, yellow, and green lights.

The wireless communication module 240 makes wireless communication with the remote control device 100.

The wireless communication module 240 receives the control signal transmitted from the remote control device 100 and transmits the control signal to the lighting driving unit 220, so that the power supplied to the lighting unit 230 may be controlled.

In this case, the wireless communication module 240 may have components corresponding to the components constituting the Bluetooth transmit module or the ZigBee transmit module of the remote control device 100.

The lighting device 200 is provided therein with the wireless communication module 240 to receive the control signal from the remote control device 100 through the wireless communication module 240, and to control the lighting unit 230 based on the control signal.

Hereinafter, the structure of the lighting device 200 will be described in more detail.

In the following description, the lighting device is assigned with reference numeral 400. However, the lighting device 400 has the same components as those of the lighting device 200, and a different reference numeral is assigned with the lighting device for the convenience of explanation.

Figure 8:
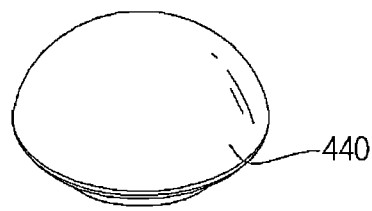
FIG. 8 is a view showing the structure of the lighting apparatus according to the embodiment.
Figure 8:
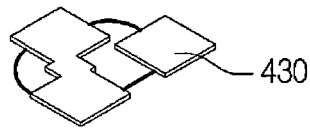
Figure 8:
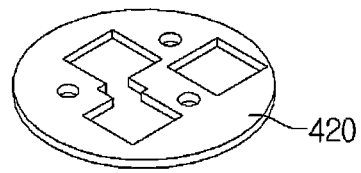
Figure 8:
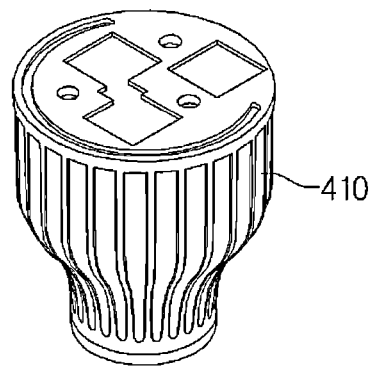
Figure 8:
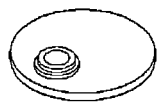
Figure 8:
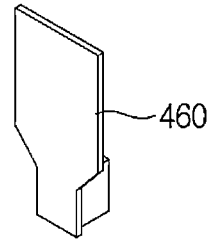
Figure 8:
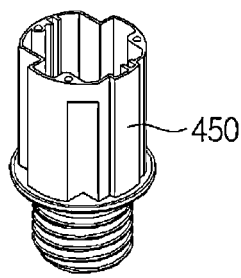

FIG. 8 is a view showing the structure of the lighting device according to the embodiment.

Referring to FIG. 8, the lighting device 400 includes a heat radiation frame 410, a heat radiation plate 420, a light emitting device 430, a diffusion frame 440, a support frame 450, and a module 460.

The heat radiation frame 410 includes an upper end portion having a flat top surface and a lower end portion substantially vertically extending along the outer peripheral surface of the flat surface of the upper end portion.

The heat radiation frame 410 may include a metallic material or a resin material representing superior heat radiation efficiency, but the embodiment is not limited thereto. For example, the material of the heat radiation frame 410 may include at least one of aluminum (Al), nickel (Ni), copper (Cu), silver (Ag), tin (Sn), and magnesium (Mg).

The heat radiation plate 420 may be provided on the top surface of the heat radiation frame 410. The heat radiation plate 420 may include a thermal conductive silicon pad or a thermal conductive tape representing superior thermal conductivity. The heat radiation plate 420 may effectively transfer heat generate from the light emitting device 430 provided on the top surface thereof to the heat radiation frame 410.

The light emitting device 430 is formed on the heat radiation plate 420. In particular, the light emitting device 430 includes at least one light emitting diode, and the light emitting diode may be secured on a substrate.

The substrate has a rectangular shape, but the embodiment is not limited thereto. The substrate may be provided by printing a circuit pattern on an insulator. For example, the typical printed circuit board (PCB) may include a metal core PCB, a flexible PCB, and a ceramic PCB. In addition, the substrate may have a COB (chips on board) type in which LED chips, which are not packaged, are directly bonded on the PCB.

In addition, the substrate may include a material to effectively reflect light, or the surface of the substrate may have a color such as a gold color or a silver color to effectively reflect the light.

At least one light emitting device 430 is provided on the substrate, and may include a light emitting diode chip to emit red, green, and blue lights or a light emitting diode chip to emit UV.

The light emitting diode may have the lateral type or the vertical type. The light emitting diode may emit one of blue, red, yellow, and green lights.

Although not shown in drawings, a lens may be additionally formed on the light emitting device 430. The lens may be provided on the substrate to cover the light emitting device 430. The lens adjusts the orientation angle or the direction of the light emitted from the light emitting device 430. In this case, the lens is a semispherical type lens, and may be fully filled with transmissive resin such as silicon resin or epoxy resin without the empty space. The transmissive resin may include phosphors that are entirely distributed throughout the transmissive resin or distributed in a portion of the transmissive resin.

When the light emitting device 430 is a blue light emitting diode, the phosphors contained in the transmissive resin of the lens may include at least one of garnet-based phosphors (YAG, or TAG), silicate-based phosphors, nitride-based phosphors, and oxynitride-based phosphors.

Only the yellow-based phosphors may be contained in the transmissive resin in order to realize natural light (white light). However, in order to improve the color rendering index and reduce a color temperature, the transmissive resin may further include green-based phosphors or red-based phosphors.

When various types of phosphors are mixed and contained in the transmissive resin, the contents of the phosphors may vary according the colors of the phosphors. In other words, green-based phosphors may be used with the content higher than that of the red-based phosphors, and yellow-based phosphors may be used with the content higher than that of the green-based phosphors.

The yellow-based phosphors include YAG of the garnet-based phosphors and silicate-based phosphors, the green-based phosphors include silicate-based phosphors and oxynitride-based phosphors, and the red-based phosphors include nitride-based phosphors.

The transmissive resin may include the mixture of various phosphors, and may include a red-based phosphor layer, a green-based phosphor layer, and a yellow-based phosphor layer which are separately formed from each other.

The diffusion frame 440 is provided on the heat radiation frame 410 and the heat radiation plate 420 to cover the light emitting device 430.

The diffusion frame 440 has a bulb shape, and the inner surface of the diffusion frame 440 is coated with ivory white pigments. The ivory white pigments may contain a diffusion agent to diffuse the light passing through the heat radiation frame 410 into the inner surface of the diffusion frame 440.

Although the material of the diffusion frame 440 include glass, since the glass is weak against the load or the external shock, the glass may preferably include plastic, polypropylene (PP), and polyethylene (PE). More preferably, the material constituting the heat radiation frame 410 may include diffusion polycarbonate (PC) representing superior light resistance, heat resistance, and impact strength.

The inner surface of the diffusion frame 440 may be provided with the surface roughness greater than the surface roughness of the outer surface of the diffusion frame 440. In other words, when the light generated from the light emitting device 430 is irradiated onto the inner surface of the diffusion frame 440 and discharged to the outside, the light irradiated onto the inner surface of the diffusion frame 440 may be discharged to the outside after the light is sufficiently scattered and diffused. If the inner surface roughness and the outer surface roughness of the diffusion frame 440 are formed with the above characteristic, the light emitting characteristic can be improved.

In addition, the diffusion frame 440 is preferably formed through a blow molding scheme to widen the orientation angle of light.

The support frame 450 may include a material representing superior insulating property and superior endurance. For example, the support frame 450 may include a resin material.

The support frame 450 has a receiving space to receive the module 460 therein.

The support frame 450 prevents the short phenomenon between the heat radiation frame 410 and the module 460 to improve the withstand voltage of the lighting device 400.

A socket is formed at a lower portion of the support frame 450. The socket is electrically connected to an external power supply so that the external power is supplied to the module 460 received in the support frame 450.

Figure 9:
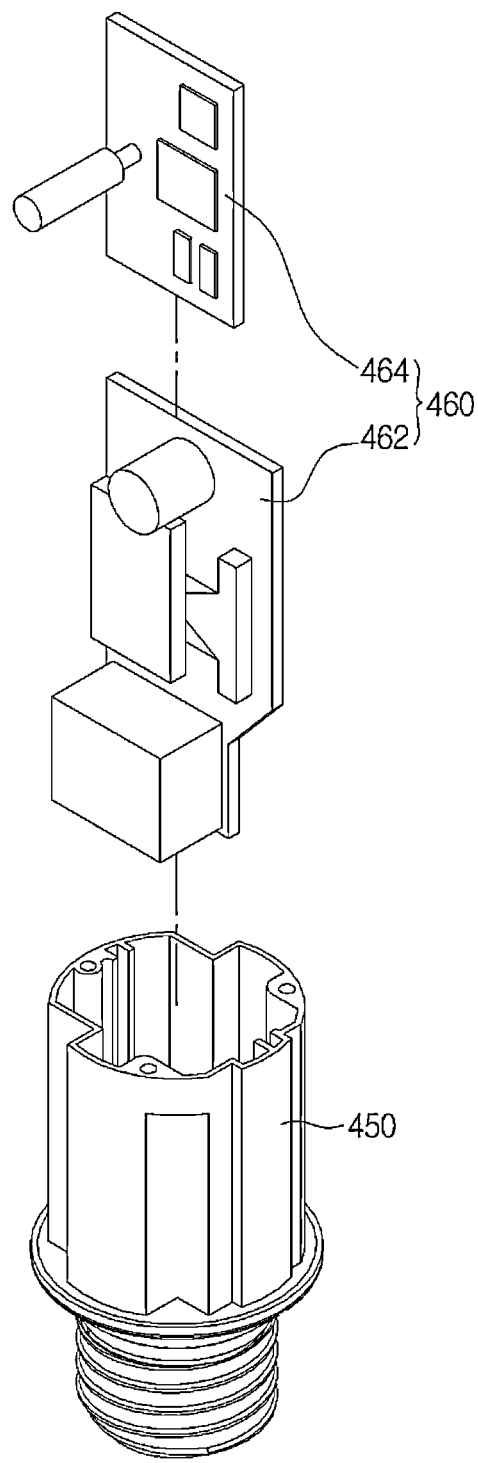
FIG. 9 is a view showing the module shown in FIG. 8.

FIG. 9 is a view used to explain the module 460 shown in FIG. 8.

Referring to FIG. 9, the module 460 includes a power supply module 462 and a wireless communication module 464. The power supply module 462 is physically separated from the wireless communication module 464.

The power supply module 462 and the wireless communication module 464 may be vertically erected in the receiving space of the support frame 450. When the power supply module 462 and the wireless communication module 464 are vertically provided, the air flow vertically occurs due to the convection phenomenon inside the support frame 450, which is less represented in the horizontal-direction arrangement, so that the heat radiation efficiency of the lighting device 400 can be increased.

In this case, the power supply module 462 is connected to a wire having a positive terminal and a negative terminal, and the wire is electrically connected to the light emitting device 430 provided on the heat radiation plate 420.

Figure 10:
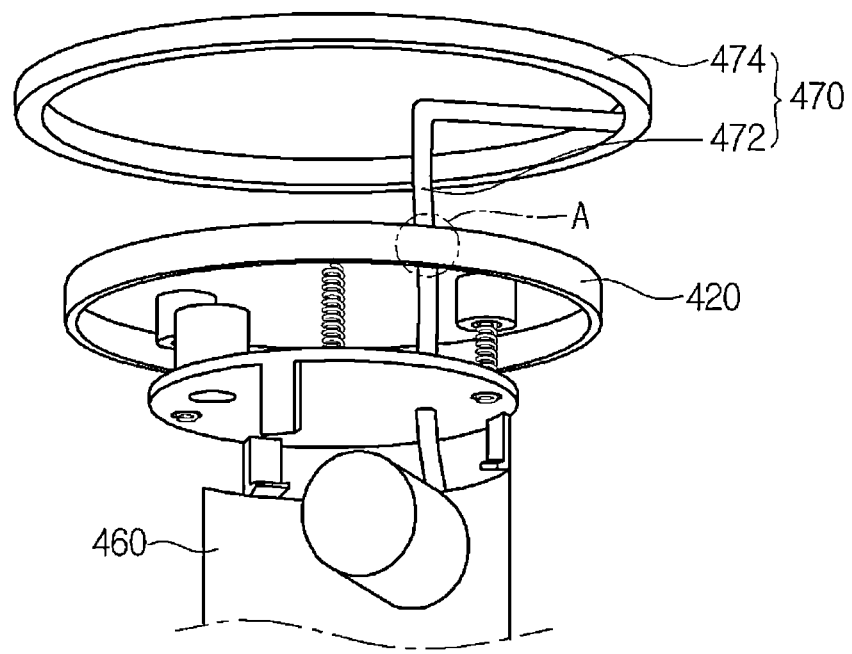
FIGS. 10 and 11 are views showing the structure of an antenna according to the first embodiment.
Figure 11:
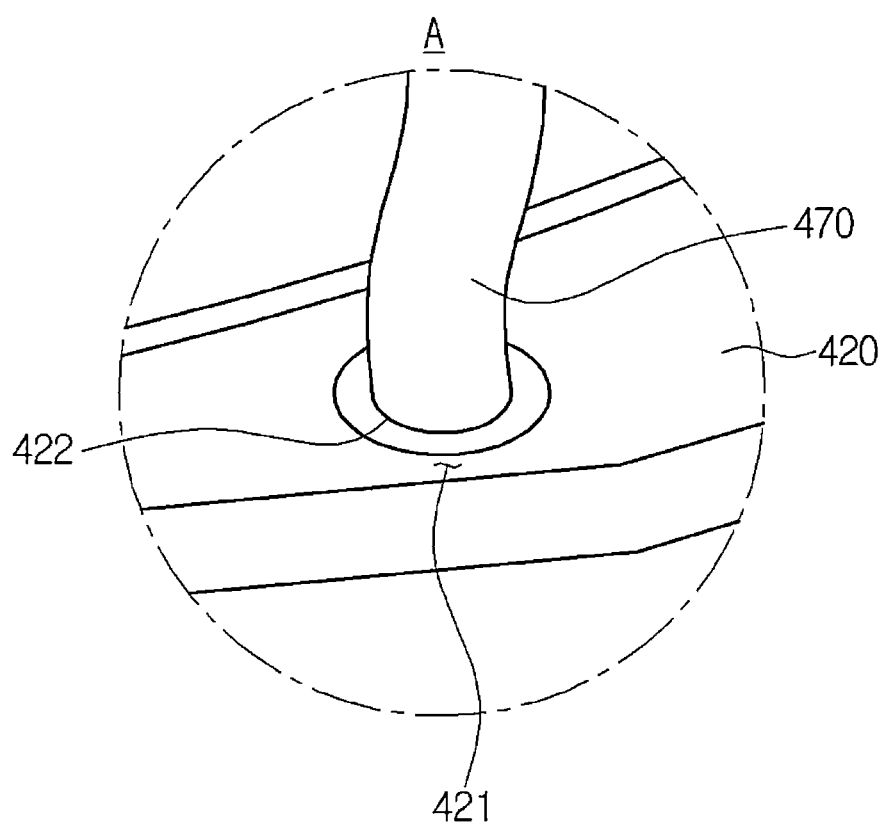

FIGS. 10 and 11 are views showing the structure of an antenna according to the first embodiment.

According to the embodiment, since the wireless communication module 464 is provided in the lighting device 400, the antenna 470 used to transmit and receive signals by the wireless communication module 464 is required.

Referring to FIGS. 10 and 11, the antenna 470 according to the embodiment is provided on the heat radiation plate 420.

In this case, when the antenna 470 is provided inside the heat radiation frame 410 or the support frame 450, the signals cannot be normally received or transmitted due to the electromagnetic wave shielding. Therefore, according to the embodiment, the antenna is provided on the heat radiation plate 420, so that the antenna 470 can be exposed to the outside the heat radiation frame 410 or the support frame 450.

The antenna 470 is spaced apart from the light emitting device 430 provided on the heat radiation plate 420 by a predetermined distance. Accordingly, the light of the light emitting device 430 can be prevented from being diffused due to the antenna 470, and the performance of receiving the signal of the antenna 470 can be prevented from being degraded due to the light emitting device 430.

Therefore, the antenna 470 makes contact with the heat radiation plate 420, and includes a first pattern 471 formed perpendicularly to the heat radiation plate 420 and a second pattern 472 formed perpendicularly to the heat radiation plate 420 while extending from the first pattern 471.

In this case, the second pattern 472 may have a circular shape.

To this end, the light emitting device 430 may be provided at the central region of the heat radiation plate 420, and the second pattern 472 of the antenna 470 may be provided along the outer peripheral region of the heat radiation plate 420. The second pattern 472 may be provided along the outer peripheral surface of the heat radiation plate 420 while being spaced apart from the heat radiation plate 420 by a predetermined distance.

The antenna 470 is connected to the module 460 provided in the support frame 450.

To this end, the heat radiation plate 420 is provided therein with an insertion hole 421 to insert the antenna 470. As the antenna 470 is inserted into the insertion hole 421, the antenna 470 extends downward to connect with the module 460.

In this case, the heat radiation plate 420 includes thermal conductive metal. Accordingly, when the heat radiation plate 420 makes contact with the antenna 470, the receive performance of the antenna 470 may be affected by the contact between the heat radiation plate 420 and the antenna 470.

Accordingly, an insulating member 422 is formed around the insertion hole 421 of the heat radiation plate 420, so that the antenna 470 is brought into the contact with the insulating member 422 instead of the heat radiation plate 420. Accordingly, the performance of transmitting and receiving signals by the heat radiation plate 420 may not be affected.

Figure 12:
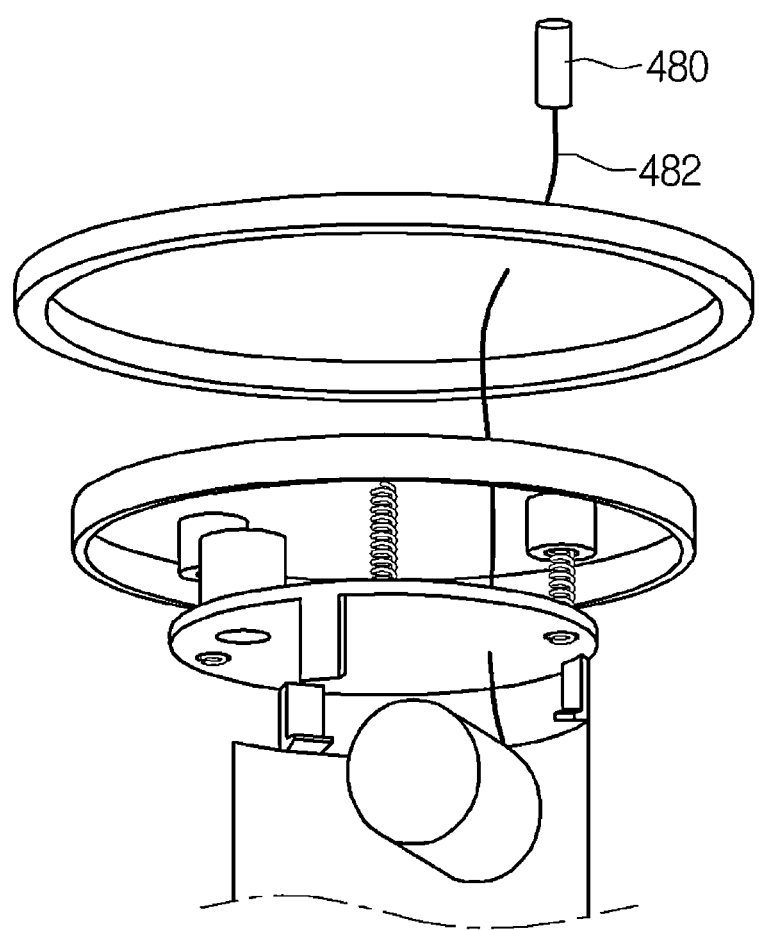
FIG. 12 is a view showing the structure of the antenna according to the second embodiment.

FIG. 12 is a view showing the structure of an antenna according to the second embodiment.

Referring to FIG. 12, the antenna 480 may be connected with the module 460 through the additional cable 482.

In this case, when the antenna 480 is provided at the inside of the heat radiation frame 410 or at the inside of the support frame 450, the signals may not be normally received or transmitted due to the EMI phenomenon. Therefore, according to the embodiment, the antenna 480 is provided on the heat radiation plate 420 in such a manner that the antenna 480 is exposed out of the heat radiation frame 410 or out of the support frame 450.

In this case, the antenna 480 may be provided in the form of a pole unlike the antenna 470 according to the first embodiment.

Meanwhile, the antennas 470 and 480 having the above structure are coated with a reflective material based on the reflection of the light emitted from the light emitting device 430. This is to prepare for the case that the light is not normally reflected by the antennas 470 and 480.

In addition, the antenna 470 and 480 must be implemented by taking into consideration the heat radiation temperature of the light emitting device 430 and the heat radiation performance according to devices.

As described above, according to the embodiment, the lighting device is provided therein with the wireless communication module, so that the lighting of the lighting device can be conveniently controlled by using the mobile terminal or the low-price remote control without an additional cable tube.

In addition, according to the embodiment, the performance of receiving the control signal to control the lighting can be improved by exposing the antenna out of a metal case for heat radiation.

Further, according to the embodiment, the above-described lighting device is provided to represent the energy efficiency sufficient to collapse the price barrier of low-price lighting devices such as existing light bulb, increase the convenience of a user through the simple replacement of parts and the simple installation of software, and prevent the loss of additional cost resulting from a wireless control function.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
a heat radiation frame;
a heat radiation plate on the heat radiation frame;
at least one light emitting device on the heat radiation plate;
a diffusion frame provided on the heat radiation frame to protect the at least one light emitting device and diffuse a light emitted from the at least one light emitting device; and
a support frame provided under the heat radiation frame and having a receiving space;
a wireless communication module in the receiving space to transmit or receive a control single of the at least one light emitting device;
a power supply module in the receiving space to supply a driving power to the at least one light emitting device and the wireless communication module; and
an antenna provided on the heat radiation plate and connected with the wireless communication module to transmit or receive the control signal;
wherein the power supply module is physically separated from the wireless communication module;
wherein the antenna comprises a first pattern extending perpendicularly to the heat radiation plate, and a second pattern extending from the first pattern such that the second pattern is formed horizontally to the heat radiation plate.

2. The lighting apparatus of claim 1, wherein the heat radiation frame comprises an upper end portion having a flat top surface and a lower end portion vertically extending along an outer circumference of the flat top surface of the upper end portion.

3. The lighting apparatus of claim 1, wherein the heat radiation plate is provided therein with an insertion hole for insertion of the antenna, and the first pattern of the antenna is inserted into the insertion hole and connected with the wireless communication module.

4. The lighting apparatus of claim 3, further comprising an insulating member provided around the insertion hole of the heat radiation plate to insulate the heat radiation plate from the antenna.

5. The lighting apparatus of claim 1, wherein the second pattern is spaced apart from the heat radiation plate with a predetermined distance due to the first pattern.

6. The lighting apparatus of claim 1, wherein the second pattern has a circular shape along an outer circumference of the heat radiation plate.

7. The lighting apparatus of claim 1, wherein the antenna is formed in a pole shape on the heat radiation plate.

8. The lighting apparatus of claim 1, wherein the antenna is coated with a reflective material used to reflect the light emitted from the at least one light emitting device.

9. The light apparatus of claim 1, wherein
at least one of the wireless communication module and the power module are vertically inserted into the receiving space of the support frame.

10. A lighting system comprising:
a remote control device to transmit a control signal for lighting control; and
a lighting apparatus to receive the control signal transmitted through the remote control device and to change a driving state of the lighting by using the received control signal,
wherein the lighting apparatus comprises:
a heat radiation frame;
a heat radiation plate on the heat radiation frame;
at least one light emitting device on the heat radiation plate;
a diffusion frame provided on the heat radiation frame to protect the at least one light emitting device and diffuse a light emitted from the at least one light emitting device;
a support frame provided under the heat radiation frame and having a receiving space;
a wireless communication module in the receiving space to transmit or receive a control single of the at least one light emitting device;
a power supply module in the receiving space to supply a driving power to the at least one light emitting device and the wireless communication module; and
an antenna provided on the heat radiation plate and connected with the wireless communication module to transmit or receive the control signal;
wherein the power supply module is physically separated from the wireless communication module;
wherein the antenna comprises a first pattern extending perpendicularly to the heat radiation plate, and a second pattern extending from the first pattern such that the second pattern is formed horizontally to the heat radiation plate.

11. The lighting system of claim 10, wherein the remote control device comprises one of a mobile terminal and a remote controller having software to control the lighting apparatus.

12. The lighting system of claim 10, wherein the remote control device and the lighting apparatus make communication with each other through any one of ZigBee and Bluetooth standards.

13. The lighting system of claim 12, further comprising an access point (AP) interposed between the remote control device and the lighting apparatus.

* * * * *